(12) United States Patent
Borthakur (10) Patent No.: US 6,834,281 B1
(45) Date of Patent: Dec. 21, 2004

(54) METHOD AND APPARATUS TO SUPPORT MULTI-NODE DIRECT ACCESS TO FILE SYSTEM DATA

(75) Inventor: Dhrubajyoti Borthakur, San Jose, CA (US)

(73) Assignee: Veritas Operating Corporation, Mountain View, CA (US)

( * ) Notice: Subject to any disclaimer, the term of this patent is extended or adjusted under 35 U.S.C. 154(b) by 479 days.

(21) Appl. No.: 10/106,165

(22) Filed: Mar. 26, 2002

(51) Int. Cl.$^7$ .............................................. G06F 17/30
(52) U.S. Cl. ................. 707/10; 707/2; 707/8; 707/200; 707/204; 379/28; 379/29.1; 709/102
(58) Field of Search ......................... 707/2, 8, 10, 200, 707/204; 379/28, 29.1; 709/102

(56) References Cited

U.S. PATENT DOCUMENTS

| | | | |
|---|---|---|---|
| 5,504,801 A | * 4/1996 | Moser et al. | 379/29.01 |
| 5,950,203 A | 9/1999 | Stakuis et al. | 707/10 |
| 6,269,382 B1 | * 7/2001 | Cabrera et al. | 707/204 |
| RE37,856 E | * 9/2002 | Browne | 379/28 |
| 6,473,775 B1 | * 10/2002 | Kusters et al. | 707/200 |
| 6,477,544 B1 | * 11/2002 | Bolosky et al. | 707/200 |
| 2001/0020245 A1 | * 9/2001 | Golds et al. | 709/102 |

\* cited by examiner

*Primary Examiner*—Thuy N. Pardo
(74) *Attorney, Agent, or Firm*—Campbell Stephenson Ascolese LLP (57) ABSTRACT

Disclosed is a method for supporting coherent multi-node access to file system data. The method can be employed in a network having first and second nodes coupled to each other via a first communication link, and a peripheral data storage device coupled to the first and second nodes via a second communication link. In one embodiment, the method includes generating a request to access data of a file stored in the peripheral data storage device. A file system, executing on the first node, then generates a first message. A first software module, executing on the first node, generates an instruction in response to the file system generating the first message. This instruction is then transmitted to the second node via the first communication link. A portion of meta data stored in memory associated with the second node is invalidated in response to the second node receiving the instruction, wherein the portion of meta data stored in memory associated with the second node corresponds to the file. Thereafter, the first node accesses data of the file via the second communication link. Eventually, the file system modifies meta data stored in memory associated with the first node in response to accessing data in the file, wherein the meta data stored in memory associated with the first node corresponds to the file.

30 Claims, 4 Drawing Sheets

METHOD AND APPARATUS TO SUPPORT MULTI-NODE DIRECT ACCESS TO FILE SYSTEM DATA

BACKGROUND OF THE INVENTION

Figure 1:
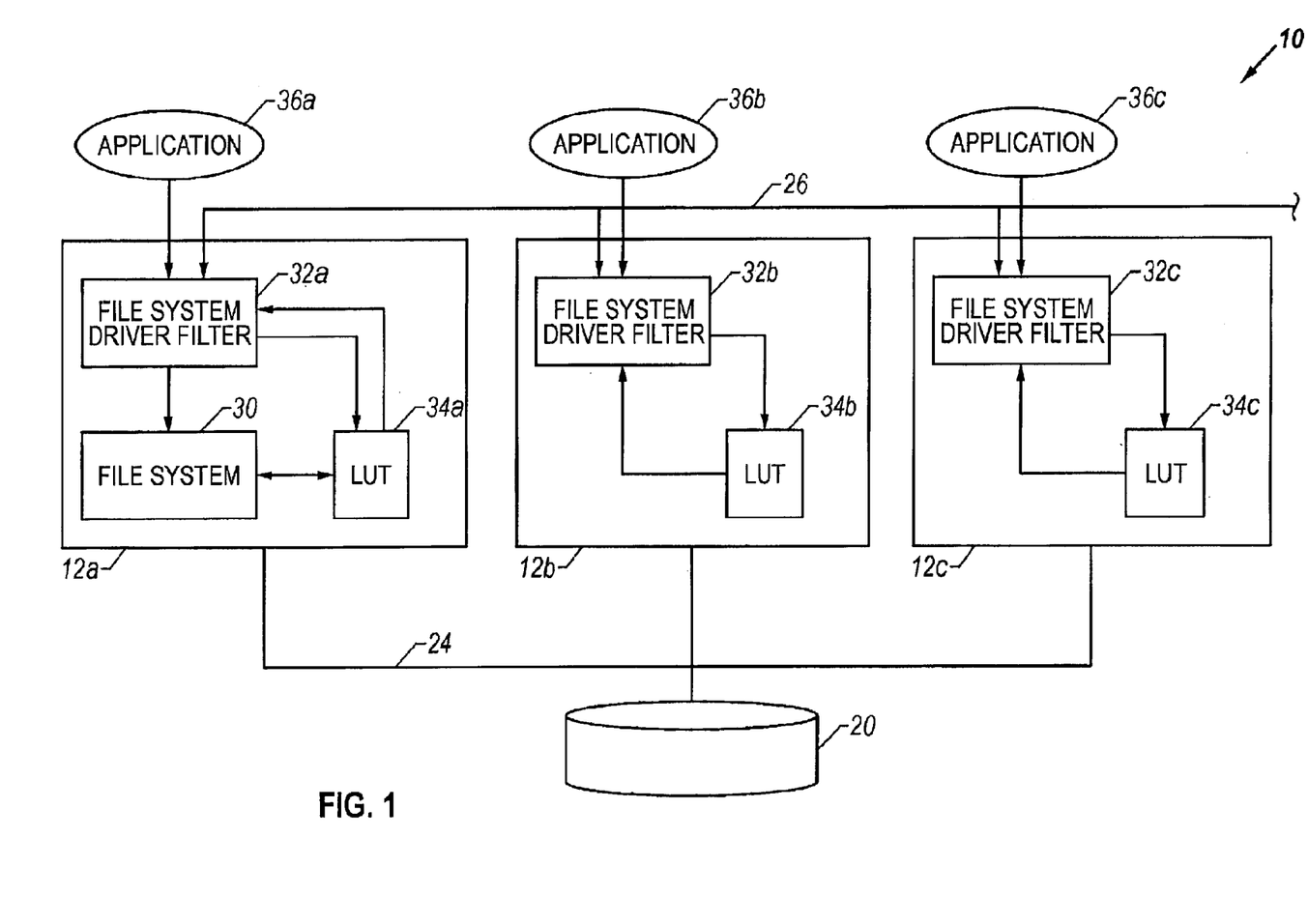
FIG. 1 is a block diagram illustrating a data processing system.

FIG. 1 illustrates a data processing system having nodes 12a–12c coupled to a storage area network (SAN). The SAN includes a data storage system 20 coupled to nodes 12a–12c via a SAN communication link 24. Lastly, nodes 12a–12c are coupled to each other via local area network (LAN) communication link 26.

Nodes 12a–12c may take form in any one of a number of different types of computer systems. For purposes of explanation, node 12a will take form in a server computer system. Nodes 12b and 12c are clients to node 12a Nodes 12b and 12c, however, may be servers for other functions.

As shown in FIG. 1, node 12 executes an operating system that includes a file system module and a file system driver filter module 30a. Nodes 12b and 12c also execute operating systems. The operating systems of nodes 12b and 2c do not include file system modules. The operating system executing on nodes 12b and 12c include file system driver filter modules 30b and 30c, respectively. Filters 30a–30c are capable of communicating with each other via LAN communication link 26.

File system 30 performs many functions. For example, file system allocates blocks or regions of memory in data storage system 20 in which data of files are stored. File system 30 also creates and maintains file meta data in lookup table (LUT) 34a. The meta data includes information which maps a file name to one or more blocks of memory in storage system 20 which contain data of the file.

Node 12a controls access to data storage system 20. As noted above, nodes 12b and 12c can access files contained within the data storage system 20. For example, application program 36b generates a request to access a file F in data storage system 20. In the prior art, this request is intercepted by the file system driver filter 32b. In response to receiving the request to access file F, file system driver filter 32b access lookup table 34b to determine whether lookup table 34b maps F to meta data needed for accessing the one or more blocks in memory of storage system 20 which contains file F data. If lookup table 34b contains valid meta data for file F, then file F in data storage system 20 is accessed according to the meta data, and information thereof is provided to application 36b via node 12b.

If, however, LUT 34b does not include valid meta data for file F, file system driver filter 32b generates a request for valid meta data. This request is transmitted to node 12a via LAN communication link 26. File system driver filter 32a of node 12a receives the request for meta data, and in response, file system driver filter 32a accesses LUT 34a to determine whether a valid copy of file F meta data is contained therein. If a valid copy is found, then file system driver filter 32a transmits a response back to file system driver filter 32b via LAN communication link 36. This response includes a valid copy of meta data for file F. File system driver 32b, in turn, stores the received meta data into LUT 34B. Once file system driver filter 32b receives the valid meta data for file F, the request to access file F, generated by application 36b, can be fulfilled.

As noted above, node 12a is capable of accessing files in data storage system 20. For example, application 36a may generate a request to modify (e.g., delete) data contained in file F or file F in its entirety. This request is intercepted by file system driver filter 32a. As noted above, file system 30 manages the allocation of memory in data storage system 20 for files stored therein. This management includes reallocation of memory blocks for files in response to, for example, a request to delete the file generated by application 36a. File system 30, in response to receiving the request to delete a file via file system driver filter 32a, accesses LUT 34a with the filename and modifies the meta data thereof when the file is, for example, deleted from the storage system 20.

One of the problems with the prior art is that a modification of meta data in LUT 34a by file system 30 can result in erroneous access of data by, for example, application 36b. More particularly, should file F stored in system 20 be deleted or perhaps truncated, file system 30 will update the meta data for file F stored in LUT 34a in accordance thereto. However, LUT 34b in node 12b contains what it believes is a valid copy of the meta data for file F which was provided by filter 32a upon a previous request for the meta data. Clearly, the meta data in LUT 34a is different from the meta data in LUT 34b. Subsequently, if application 36b generates a new request to read file F after the meta data in LUT 34a has been modified, the read request may result in accessing erroneous data because of the difference in file F meta data contained in LUTS 34a and 34B.

To avoid this situation, when file system driver filter 32a receives a request to access a file from application 36a which will result in a change in the meta data that identifies the one or more memory blocks that contain the file data, file system driver filter 32a transmits instructions to file system driver filter 32b and file system driver filter 32c, via LAN communication link 26, to invalidate meta data for file F stored in LUTs 34b and 34c. File system driver filters 32b and 32c invalidate the meta data for file F in LUTs 34b and 34c if nodes 12b and 12c are not currently accessing file F. If file F is currently being accessed via nodes 12b and/or 12c, then file system driver filters 32b and 32c will delay the invalidation of the meta data for file F until the access is complete.

Once file system drivers 32b and 32c invalidate the meta data for file F contained in LUTs 34b and 34c, file system drivers 32b and 32c transmit a message back to file system driver filter 32a, via LAN communication link 26, indicating that file F is not being accessed by nodes 12b or 12c and that nodes 12b and 12c have invalidated meta data for file F stored therein. In response, the request to delete file F generated by 36a is subsequently transmitted by file system driver filter 32a to file system 30. File F is depleted from storage 20, and the meta data for file F is updated in LUT 34a.

The system for maintaining the integrity of meta data for files in nodes 12b and 12c works well so long as file system driver filter 32a receives notification that meta data for a particular file will be changed in LUT 24a before the meta data therein changes. A problem arises when file system 30 directly receives (rather than indirectly receiving via the file system driver filter 32a) an access request which, when fulfilled, results in a modification of meta data that maps a file to one or more memory blocks. For example, file system 30 may receive an input/output (IO) control call to defragment data storage system 20. This call is not received via filter 32a. File system 30 may also self initiate (i.e., without an externally received call) the storage defragmentation process. File system defragmentation of system 20, whether self initiated or initiated in response to an externally received call, when completed may result in a modification in meta data that maps the file to one or more memory blocks.

At any rate, because certain access requests (e.g., I/O call for defragmentation) which do not first pass through file system driver filter 32a and, when completed, result in a modification of meta data in LUT 34a by file system 30, LUTs 34b and 34c may unknowingly store invalid meta data. Requests to access files using invalid meta data will result in a return of erroneous data

SUMMARY OF THE INVENTION

Disclosed is a method for supporting coherent multi-node access to file system data. The method can be employed in a network having first and second nodes coupled to each other via a first communication link, and a peripheral data storage device coupled to the first and second nodes via a second communication link. In one embodiment, the method includes generating a request to access data of a file stored in the peripheral data storage device. A file system, executing on the first node, then generates a first message. A first software module, executing on the first node, generates an instruction in response to the file system generating the first message. This instruction is then transmitted to the second node via the first communication link. A portion of meta data stored in memory associated with the second node is invalidated in response to the second node receiving the instruction, wherein the portion of meta data stored in memory associated with the second node corresponds to the file. Thereafter, the first node accesses data of the file via the second communication link. Eventually, the file system modifies meta data stored in memory associated with the first node in response to accessing data in the file, wherein the meta data stored in memory associated with the first node corresponds to the file.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 2:
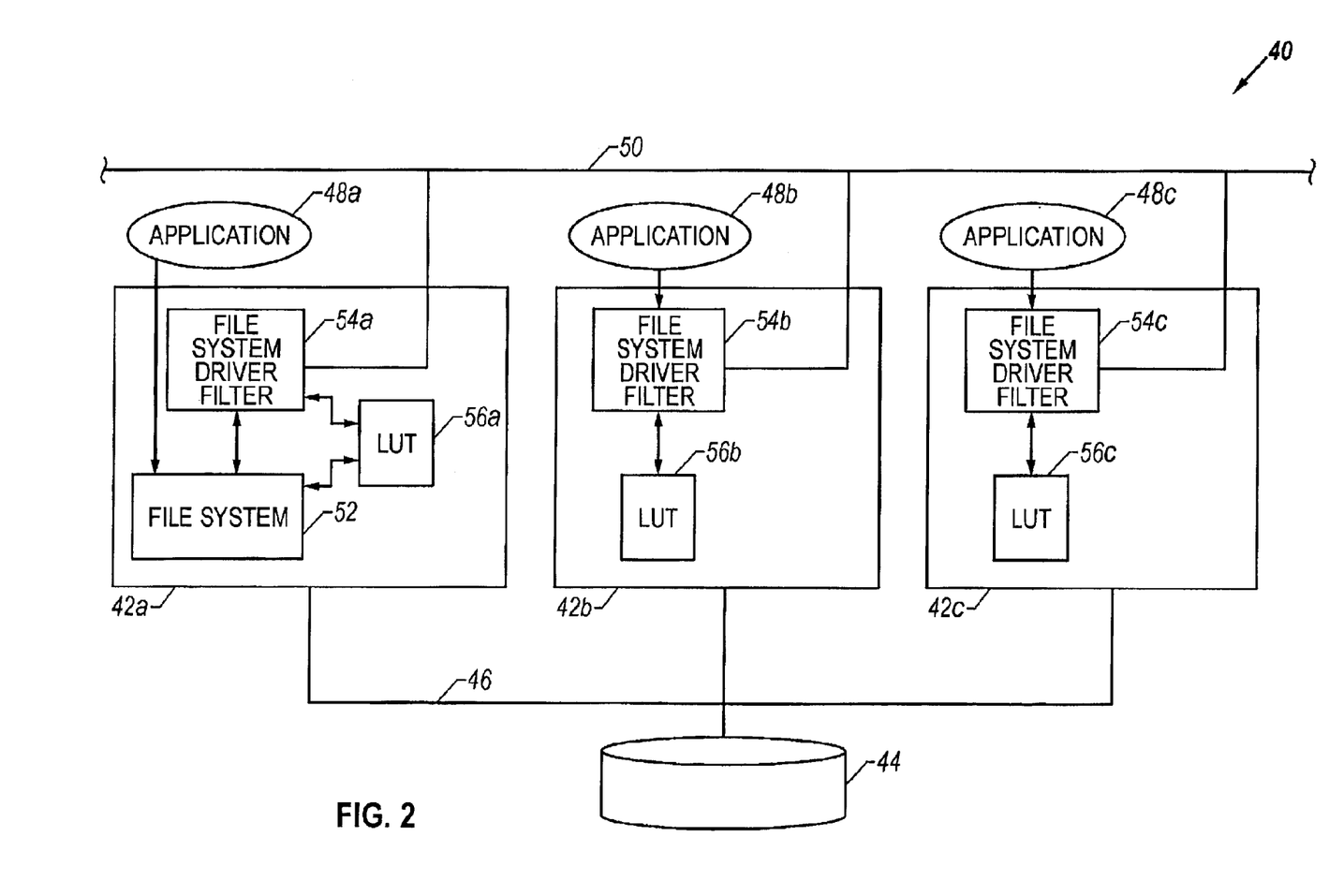
FIG. 2 is a block diagram illustrating a data processing system employing one embodiment of the present invention.

FIG. 2 illustrates relevant components of a data processing system 40 employing one embodiment of the present invention. Data processing system 40 includes nodes 42a, 42b, and 42c coupled to a SAN, the SAN consisting of a data storage system 44 and an SAN communication link 46. Nodes 42a, 42b, and 42c are capable of accessing data files in data storage system 44 via SAN communication link 46. It is understood that a traditional SAN may include additional components including a channel switch coupled between nodes 42a–42c and data storage system 44. The channel switch could be coupled to nodes 42a, 42b, and 42c and to storage system 44 via individual communication links. It is noted that storage system 44 may include several data storage systems including magnetic or optical disk arrays. However, for purposes of explanation, the SAN of FIG. 1 will include only the SAN communication link 46 and data storage system 44.

Each of the nodes 42a through 42c may take form in one or more computer systems. For purposes of explanation, each of the nodes 42a through 42c will take form in server computer systems, it being understood that the present invention should not be limited thereto. Node 42a performs functions such as accessing files stored in storage system 44 and managing files within storage system 44 as will be more fully described below. Nodes 42b and 42c may act as clients to nodes 42a and may be servers for other functions. Nodes 42b and 42c can access data files in storage system 44 in response to requests received thereby. Nodes 42a through 42c are in data communication with each other via LAN communication link 50.

Node 42a includes an operating system executing on or more microprocessors contained therein. The operating software includes a file system module 52 and a file system driver filter module 54a. The file system 52 is module that controls a physical placement and access to files stored within a storage device. The file system driver filter module 54a is distinct from the file system module 52. Node 42a also includes a LUT 56a for storing meta for files in storage system 44. It is noted that this meta data need not be stored in memory of node 42a.

File system 52 performs many functions. For example, file system allocates blocks or regions of memory in data storage system 44 in which data of files are stored. File system 30 also creates and maintains file meta data in lookup table (LUT) 56a. The meta data includes information which maps a file name to one or more blocks of memory in storage system 44 which contain data of the file.

Nodes 42b and 42c include file system driver filters 54b and 54c, respectively, each of which is a software module executing on one or more processors. Nodes 42b and 42c do not include file systems. Each of the nodes 42b and 42c are capable of accessing files within storage system 44 in response to access requests received from, for example, software applications 48b and 48c. For example, application 48b may generate a request to read data contained in file F stored within data storage system 44. This read access request is intercepted by filter 54b that, in turn, accesses a memory, such as LUT 56b, to determine whether valid meta data necessary for accessing file F is contained therein. If valid meta data is contained within LUT 54b, the meta data is used by node 42b to access the file F in data storage system 44, and data thereof is provided back to application 48b. It is noted that the memory which is accessed for the meta data need not be contained in node 12b.

Node 42a is also capable of responding to requests to access files within data storage system 44. For example, node 42a is capable of receiving read or write requests generated by application 48a. As will be more fully described below, write access requests which modify data files may be processed differently by node 42a when compared node 42a processing of write requests that do not result in data file modification.

File system 52, in one embodiment, maintains a plurality of tokens, each one of which corresponds to a respective file stored in storage system 44. File system 52, in one embodiment, is capable of exporting three interfaces through which actions on the tokens can occur, a first interface to retrieve a token; a second interface to release a token, and; a third interface to register a revoke function RF with the file system.

Each of the tokens is capable of being possessed by the file system 52 or the filter 54a, but not both. If filter 54a possesses the token, for example, for file F, then file system 52 will not modify meta data within LUT 56a which maps file F to one or more blocks of memory in storage system 44 in response to any request to access file F received by file system 52 or in response to a process which is self initiated by file system 52. In contrast, if file system 52 has possession of the token corresponding to file F, then file system 52 may modify meta data within LUT 56a that maps file F to one or more memory blocks in data storage system 44.

In one embodiment, possession of the tokens may be determined with reference to a table contained within memory of node 42a. This table may include a plurality of entries, each one of which corresponds to a file name. Each entry includes at least one bit which is set to logical 0 or logical 1 depending on whether file system 52 or filter 54a "has possession of the corresponding token." Either file system 52 or filter 54a may direct or indirect access this table in memory to determine whether file system 52 or filter 54a has possession to a token corresponding to a particular file.

In the embodiment which employs the three interfaces set forth above, filter 54a, registers a revoke function RF with the file system using the third interface. Filter 54a may take possession of the token corresponding to a file (e.g., file F) using the second interface to retrieve the token for file F. Thereafter, filter 54a may extract the meta data which maps file F to one or more memory blocks from LUT 56a. Filter then transmits the extracted meta data to filters 54b and 54c via LAN 50 for storage in LUTs 56b and 56c. Because filter 54a has "possession" of the token corresponding to file F, file system 52 cannot modify the meta data for file F and create a situation where LUT 56a stores meta data for file F which is different from the meta data for file F stored in LUTs 56b and 56c. Accordingly, application 48b or application 48c can access file F in data storage 44 without fear of receiving invalid data as a result of using invalid meta data in accessing file F.

The revoke function RF may be part of filter 54a, and its invocation indicates to filter 54a that it is time to release the token back to file system 52. Before release of the token, filter 54a may transmit a message to filters 54b and 54c via LAN 50 that their copy of meta data for mapping the file to the one or more memory blocks, is invalid. Thereafter, filter 54a may release the token to the file system 52, and the file system 52 is free to modify the meta data for the file once the token is released.

Figure 3:
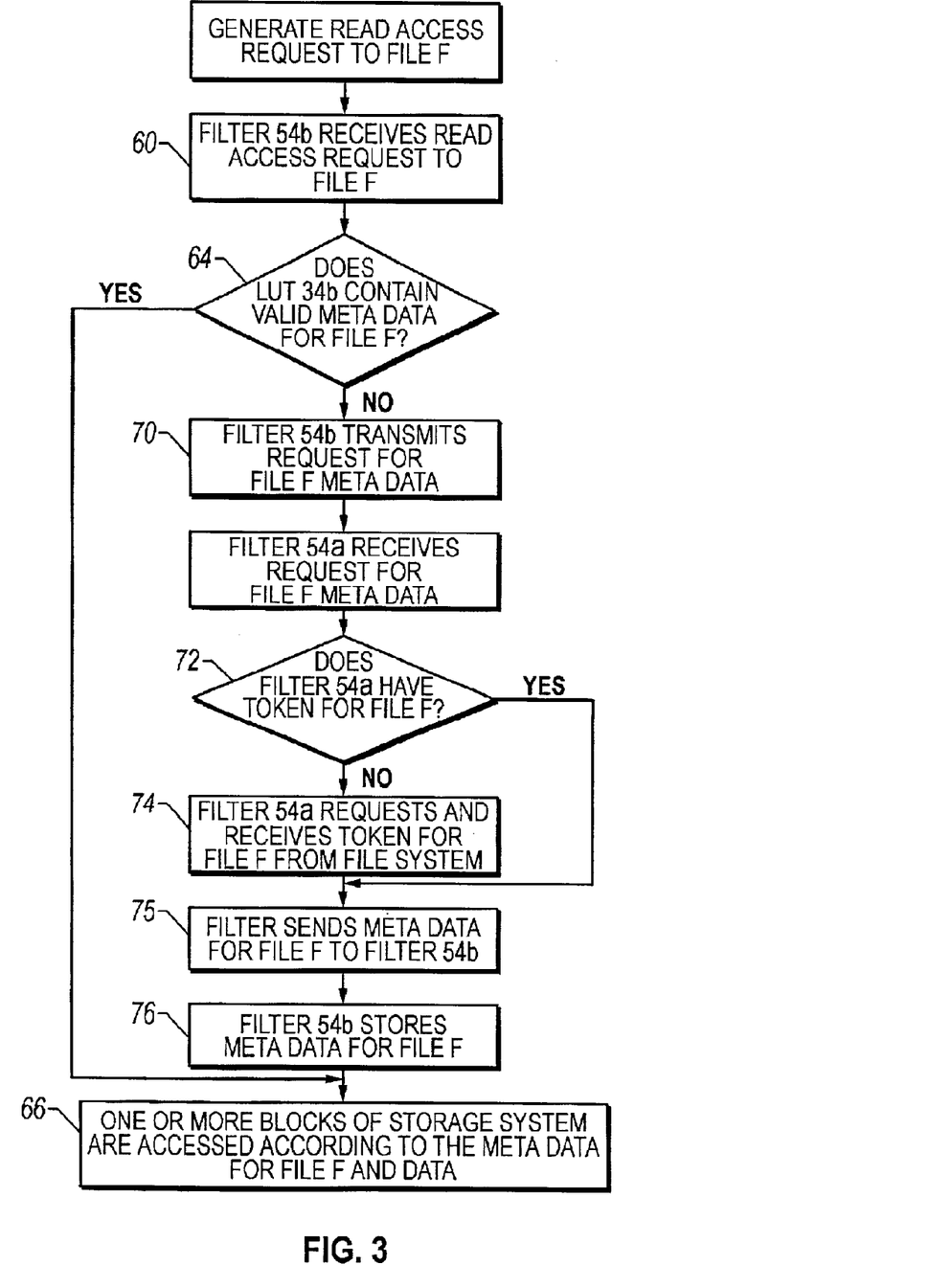
FIG. 3 is a flow chart illustrating operational aspects of accessing the data storage system via one of the nodes of FIG. 1.

FIG. 3 is a flow chart illustrating relevant operational aspects of node 42b when reading data of a file contained in storage system 44. More particularly, in step 60, filter 54b receives a request to read data contained in file F from application 48b. In response, filter 54b determines whether LUT 56b contains valid meta data for file F in step 64. If LUT 56b does contain valid meta data which maps file F in storage system 44, then the process proceeds eventually to step 66 where one or more blocks in the storage system 44 are accessed using the valid meta data in LUT 56b. Data of file F is returned to application 48b.

If, however, LUT 56b does not contain valid meta data for file F, then the process proceeds to step 70 where filter 54b generates and transmits a request for valid meta data for file F via LAN 50. In step 72, filter 54a, in response to receiving the request for meta data, determines whether it has possession of the token corresponding to file F in step 72. If filter 54a does not have possession of the token corresponding to file F, then filter 54a requests and eventually is granted possession of the token for file F as shown in step 74. Eventually, filter 54a accesses LUT 56a and transmits a copy of the valid meta data via link 50. It is noted that only that portion of the meta data which maps file F to one or more blocks in storage system 44 need be transmitted.

Filter 54b, in step 76, in response to receiving the meta data transmitted by filter 54a, stores the valid meta data for file F in LUT 56b as shown in step 76. It is noted that filter 54c may also receive the meta data transmitted by filter 54a in step 75. Filter 54c may store this meta data in LUT 56c. Once LUT 56b contains a valid copy of the meta data for mapping file F, then file F can be accessed and its data provided to application 48b.

With filter 54a in possession of the token corresponding to file F, file system 52 is prohibited from modifying meta data which maps file F within storage system 44. Accordingly, application 48b will receive valid data stored in file F so long as LUT 56b indicates the corresponding meta data is valid therein.

Figure 4:
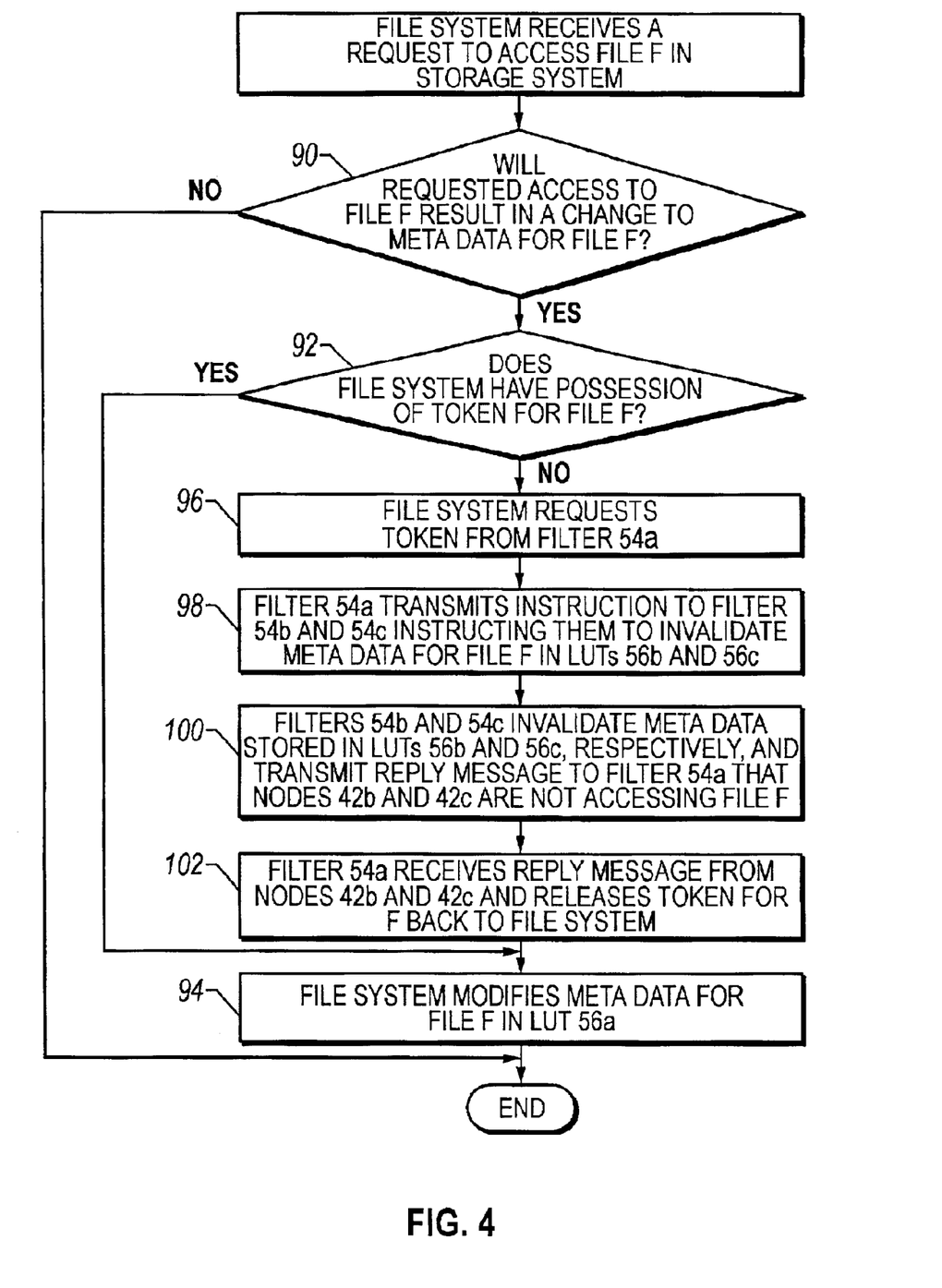
FIG. 4 is a flow chart illustrating operational aspects of accessing the data storage system via another of the nodes of FIG. 1.

As noted above, file system 52 is prohibited from modifying file meta data unless file system 52 has possession of the corresponding token. FIG. 4 is a flow chart illustrating relevant aspects of one embodiment by which file system 52 modifies meta data stored within LUT 56a in response to the file system receiving a request to access a file in storage system 44. The request may come from application 48a or from a software component external from the file system 52. Additionally, the request may be generated internally within file system 52 rather than being received by the file system.

In step 90, file system 30, in response to file system 30 receiving a request to access file F in storage system 44, a determination is made as to whether the requested access to file F will result in a change to the meta data which maps file F within storage system 44. This determination may be made internally within the file system 52. Alternatively, the determination may be made by a module external to the file system 52 but which is in data communication with the file system. Step 90 can be performed by file system 52 (or the external module mentioned above) by comparing the request to access against a predetermined number of access requests to determine whether the received request to access equals any of the predetermined access requests. For example, one of the predetermined access requests may be a request to delete a file. If the request received by file system 52 is a request to delete file F, then file system 52 can determine that this received request will ultimately result in a change of meta data that maps file F as a result to the received request comparing equally to one of the predetermined access requests. If file system 52 determines that the received request will not result in a change in the meta data for file F, then the received request is processed and file F is accessed via node 42a.

If, however, the received request will result in a change to the meta data which maps file F, then in step 92 file system 52 determines whether it has possession of the token corresponding to file f. If it does, then access to file F is permitted in accordance with the received request, and file system 52 modifies the relevant meta data in step 94. If, however, file system 52 determines that it does not have possession of the token corresponding to file F, then a request is generated to release the token corresponding to file F. This request can be generated by file system 52 as shown in step 96. The file system may initiate the interface to retrieve the token mentioned above in step 96, and filter 54a may respond with initiating the interface to release the token back to the file system mentioned above.

Once filter 54a receives the request to release possession of the token, filter 54a transmits an instruction to filters 54b and 54c instructing them to invalidate at least the meta data that maps file F within system 44 as shown in step 98. In response, filters 54b and 54c invalidate the meta data identified in the received instruction in LUTs 56b and 56c, respectively, after filters 54b and 54c determine that nodes 42b and 42c, respectively, are not accessing file F as shown in step 100. In step 102, filter 54a receives the reply message from nodes 42b and 42c, and subsequently releases possession of the token for file F to file system 52. In this step, filter 54a may initiate the interface for releasing the token back to the file system mentioned above. However, the token is released only after all nodes have replied that they are no longer accessing file F and the meta data within their respective LUTs has been invalidated. Eventually, in step 94, file F is accessed via node 42a, and file system 52 modifies the meta data for file F in LUT 56a Although the present invention has been described in connection with several embodiments, the invention is not intended to be limited to the specific forms set forth herein, but on the contrary, it is intended to cover such alternatives, modifications, and equivalents as can be reasonably included within the scope of the invention as defined by the appended claims.

What is claimed is:

1. In a network comprising first and second nodes coupled to each other via a first communication link, and a peripheral data storage device coupled to the first and second nodes via a second communication link, a method comprising:

generating a request to access data of a file stored in the peripheral data storage device;

a file system, executing on the first node, generating a first message in response to generation of the request;

a first software module, executing on the first node, generating an instruction in response to the file system generating the first message;

transmitting the instruction to the second node via the first communication link;

invalidating a portion of meta data stored in memory associated with the second node in response to the second node receiving the instruction, wherein the portion of meta data stored in memory associated with the second node corresponds to the file;

the first node accessing data of the file via the second communication link in response to invalidation of the portion of meta data stored in memory associated with the second node;

the file system modifying meta data stored in memory associated with the first node in response to accessing data in the file, wherein the meta data stored in memory associated with the first node corresponds to the file.

2. The method of claim 1 wherein the file system receives the request, and wherein the file system generates the first message in response to receiving the request.

3. The method of claim 1 further comprising:

determining whether the first node access to data of the file will or will not result in subsequent modification of meta data stored in memory associated with the first node;

wherein the file system generates the first message in response to determining that the first node access to data of the file will result in subsequent modification of meta data stored in memory associated with the first node.

4. The method of claim 3 wherein determining further comprises:

the file system comparing the request against a plurality of requests;

wherein the file system generates the first message if the request compares equally to any of the plurality of requests.

5. The method of claim 1 further comprising:

determining whether the first module has possession of a token corresponding to the file;

wherein the file system generates the first message in response to determining that the first module has possession of the token.

6. The method of claim 5 wherein the first message is an instruction to release possession of the token.

7. The method of claim 6 further comprising:

the first module releasing possession of the token to the file system after invalidation of the portion of meta data stored in memory associated with the second node;

wherein the file system accesses data of the file via the second communication link in response to the first module releasing possession of the token.

8. The method of claim 1 further comprising:

the file system comparing the request against a plurality of requests;

determining whether the first module or the file system has possession of a token corresponding to the file;

wherein the file system generates the first message if the request compares equally to any of the plurality of requests and if the first module is determined to have possession of the token.

9. The method of claim 1 further comprising:

a second module receiving a second request to access data in the file;

determining whether the portion of meta data stored in memory associated with the second node is valid;

the second module generating a request for meta data in response to determining that the portion of meta data stored in memory associated with the second node is invalid;

the first node receiving the meta data request from the second node via the first communication link;

the first node transmitting a copy of the modified meta data to the second node via the first communication link in response to receiving the request for meta data;

the first node accessing data of the file via the second communication link using the received copy of the modified meta data.

10. The method of claim 9 further comprising:

determining whether the first module has possession of a token in response to the first node receiving the request for meta data, wherein the token corresponds to the file;

the first module generating a request for possession of the token in response to determining that the first module does not have possession of the token;

the first node transmitting the copy of the modified meta data after generation of the request for possession of the token.

11. The method of claim 9 comprising:

determining whether the first module has possession of a token in response to the first node receiving the request for meta data, wherein the token corresponds to the file;

the first node transmitting the copy of the modified meta data in response to determining that the first module has possession of the token.

12. A computer readable medium storing instructions executable by a computer system to implement a method, the method comprising:

generating a message in response to a file system, executing on the computer system, receiving a request to access data of a file stored in a peripheral data storage device coupled to the computer system via a first communication link;

transmitting the message to a second computer system coupled to the computer system via a second communication link, wherein the message comprises an instruction to invalidate a portion of first data stored in memory associated with the second computer system, wherein the first data stored in memory associated with the second computer system corresponds to the file;

accessing data of the file via the first communication link in response to receiving a reply message from the second computer system via the second communication link.

13. The computer readable medium of claim 12 wherein the method further comprises:

determining whether the computer system access to data of the file will or will not result in subsequent modification of first data stored in memory associated with the computer system, wherein the first data stored in memory associated with the computer system corresponds to the file;

wherein the message is generated in response to determining that the computer system access to data of the file will result in subsequent modification of first data stored in memory associated with the computer system.

14. The computer readable medium of claim 13 wherein the determining further comprises:

comparing the request against a plurality of requests;

wherein the message is generated if the request compares equally to any of the plurality of requests.

15. The computer readable medium of claim 12 wherein the method further comprises:

determining whether the file system has possession of a token corresponding to the file;

wherein the message is generated in response to determining that the file system does not have possession of the token.

16. The computer readable medium of claim 15 wherein the method further comprises:

releasing the token to the file system after receiving the reply message from the second computer system via the second communication link;

wherein the file system accesses data of the file via the second communication link in response to releasing the token to the file system.

17. The computer readable medium of claim 12 wherein the method further comprises:

comparing the request against a plurality of predetermined requests;

determining whether the file system has possession of a token corresponding to the file;

wherein the message is generated if the request compares equally to any of the plurality of requests and if it is determined that the file system does not have possession of the token.

18. A computer readable medium comprising instructions executable in a network to implement a method, the network comprising first and second nodes coupled to each other via a first communication link and a peripheral data storage device coupled to the first and second nodes via a second communication link, wherein data stored in the peripheral data storage device is accessible via the first or second node, the method comprising:

generating a message in response to a file system, executing on the first node, receiving a request to access data in the file via the first node;

the first node transmitting the message to the second node via the first communication link;

invalidating a portion of meta data stored in memory associated with the second node in response to the second node receiving the message, wherein the portion of meta data stored in memory associated with the second node corresponds to the file;

the first node accessing data of the file via the second communication link after transmitting the message to the second node.

19. The computer readable medium of claim 18 wherein the method further comprises:

creating a table of single bit entries in memory, wherein each entry corresponds to a respective file stored in the peripheral data storage device;

after the file system receives the request and prior to generation of the message, accessing the table to determine whether the entry corresponding to the file is set to a first or second state;

wherein the message is generated and transmitted to the second node in response to determining that the entry corresponding to the file is set to the first state.

20. The computer readable medium of claim 18 wherein the method further comprises, after the second node receives the message, the second node transmitting a second message to the first node, wherein the second message indicates that no access to data of the file is occurring via the second node.

21. The computer readable medium of claim 20 wherein the method further comprises:

changing the state of the entry from the first state to the second state after the first node receives the second message from the second node;

modifying a portion of meta data stored in memory associated with the first node after the state of the entry is changed from the first state to the second state, wherein the meta data stored in memory associated with the first node corresponds to the file.

22. A network system comprising:

a first node comprising a memory storing instructions executable by the first node;

a second node coupled to the first node via a first communication link;

a peripheral data storage device coupled to the first and second nodes via a second communication link, wherein data stored in the peripheral data storage device is accessible via the first and second nodes;

wherein the first node, when executing the instructions stored in the memory, implements a method, the method comprising:

generating a message in response to a file system, executing on the first node, receiving a request to access data of a file stored in a peripheral data storage device;

transmitting the message to the second node via the first communication link, wherein the message comprises an instruction to invalidate a portion of first data stored in memory associated with the second node, wherein the first data stored in memory associated with the second node corresponds to the file;

accessing data of the file via the second communication link in response to receiving a reply message from the second node via the first communication link.

23. A method comprising:

a computer system generating a message in response to a file system, executing on the computer system, receiving a request to access data of a file stored in a peripheral data storage device coupled to the computer system via a first communication link;

transmitting the message to a second computer system coupled to the computer system via a second communication link, wherein the message comprises an instruction to invalidate a portion of first data stored in memory associated with the second computer system, wherein the first data stored in memory associated with the second computer system corresponds to the file;

accessing data of the file via the first communication link in response to receiving a reply message from the second computer system via the second communication link.

24. The method of claim 23 further comprising:

determining whether the computer system access to data of the file will or will not result in subsequent modification of first data stored in memory associated with the computer system, wherein the first data stored in memory associated with the computer system corresponds to the file;

wherein the message is generated in response to determining that the computer system access to data of the file will result in subsequent modification of first data stored in memory associated with the computer system.

25. The method of claim 24 wherein the determining further comprises:

comparing the request against a plurality of requests;

wherein the message is generated if the request compares equally to any of the plurality of requests.

26. The method of claim 23 further comprising:

determining whether the file system has possession of a token corresponding to the file;

wherein the message is generated in response to determining that the file system does not have possession of the token.

27. The method of claim 26 further comprising:

releasing the token to the file system after receiving the reply message from the second computer system via the second communication link;

wherein the file system accesses data of the file via the second communication link in response to releasing the token to the file system.

28. The method of claim 23 further comprising:

comparing the request against a plurality of predetermined requests;

determining whether the file system has possession of a token corresponding to the file;

wherein the message is generated if the request compares equally to any of the plurality of requests and if it is determined that the file system does not have possession of the token.

29. An apparatus comprising:

means for generating a message in response to a file system, executing on a computer system, receiving a request to access data of a file stored in a peripheral data storage device coupled to the computer system via a first communication link;

means for transmitting the message to a second computer system coupled to the computer system via a second communication link, wherein the message comprises an instruction to invalidate a portion of first data stored in memory associated with the second computer system, wherein the first data stored in memory associated with the second computer system corresponds to the file;

means for accessing data of the file via the first communication link in response to receiving a reply message from the second computer system via the second communication link.

30. The apparatus of claim 29 further comprising:

means for determining whether the computer system access to data of the file will or will not result in subsequent modification of first data stored in memory associated with the computer system, wherein the first data stored in memory associated with the computer system corresponds to the file;

wherein the message is generated in response to determining that the computer system access to data of the file will result in subsequent modification.

* * * * *